Dec. 7, 1965  L. R. BELOHLAV ETAL  3,222,276
BROMINATION PROCESS
Filed Feb. 6, 1963
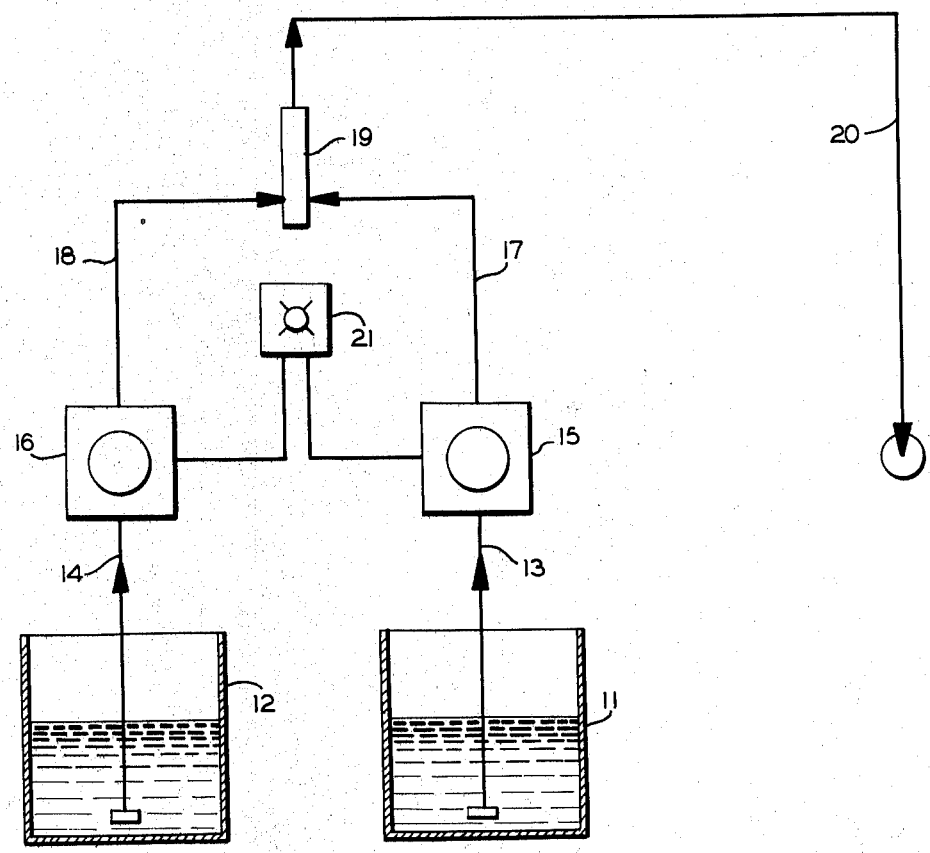
INVENTORS
LEO R. BELOHLAV
JAMES R. UNDERHILL
BY
*Dean Lawrence*
ATTORNEY

United States Patent Office 3,222,276
Patented Dec. 7, 1965

3,222,276
BROMINATION PROCESS
Leo Rudolf Belohlav and James Robert Underhill, Lafayette, Ind., assignors to Great Lakes Chemical Corporation, West Lafayette, Ind., a corporation of Michigan
Filed Feb. 6, 1963, Ser. No. 256,565
5 Claims. (Cl. 210—62)

This invention relates to a bromination process, more particularly, to a water or swimming pool bromination process.

Bromine is an excellent water sanitizing agent and provides several advantages over the use of chlorine, particularly when used to disinfect swimming pool water. Bromine is less irritating to the eyees and other mucous membranes than chlorine when used in comparable quantities. And less bromine is required since there is less loss of bromine to the atmosphere and to reactions with extraneous compounds in the water.

A major problem in the use of bromine in water sanitation is that existing bromination processes require the use of either bottled liquid bromine which creates a potential safety hazard or stick bromine which is not only expensive to use but makes bromine dosage level control difficult. When using stick bromine, the bromine intake is dependent on the solubility of the stick bromine in water. As solubility of the stick bromine depends on the water temperature, solid surface area of the stick bromine exposed to the water, condition of the exposed area, and water recirculation rate, bromine dosage control is very difficult. A further objection to the use of stick bromine is that it adds undesirable organics to the pool water. It is to be noted that the use of hypochlorites as a pool water disinfectants suffers from substantially the same disadvantages as the use of elemental chlorine.

It is an object of this invention to provide a safe swimming pool bromination process that overcomes the disadvantages of existing chlorination and bromination processes. The present process employs materials of moderate cost in an easily controlled system and leaves a minimum of undesirable impurities in the pool.

The invention sought to be patented in one aspect resides in the concept of brominating the water in a swimming pool having a pool water recycle system comprising the steps of mixing metered quantities of a bromide-bromate salt solution and a mineral acid solution, thereby liberating elemental bromine, and introducing said liberated elemental bromine into the pool recycle water system.

In a preferred embodiment of the process, the bromide-bromate salt solution has a bromide-bromate mole ratio of approximately 5:1. Metered quantities of bromide-bromate salt solution are mixed with and acidified by metered quantities of a suitable mineral acid solution such as hydrochloric acid in a ratio adequate to liberate elemental bromine in accordance with the reaction:

$$5Br^- + BrO_3^- + 6H^+ \rightarrow 3Br_2 + 3H_2O$$

It is a particularly important aspect of this process that the acidification of the bromide-bromate takes place in a space removed from the main water stream; otherwise the acid is neutralized by the main body of water being treated prior to effective bromine liberation. The acidified stream carrying dissolved free bromine is then mixed with a regulated flow of pool recycle or recirculating water being returned to the pool.

Apparatus for practicing the swimming pool bromination process includes a separate hold tank and metering system for the bromide-bromate solution and the mineral acid solution. The rates of flow are adjusted to yield a maximum liberation of elemental bromine and to establish the desired pool water bromine level. Using suitable pumping means, metered quantities of the respective bromide-bromate and acidic solution are passed to a suitable mixing chamber where elemental bromine is liberated, producing a stream of water carrying dissolved free bromine. This stream of water, containing a relatively heavy concentration of bromine, is then mixed with the pool recycle stream being returned to the pool. Usually 1 part per million level of bromine is maintained in the pool water and 3 parts per million bromine level is maintained in the pool recirculation system. The exact levels maintained are dependent upon the quantities of bromide-bromate and acid solutions mixed, the rate and duration of flow of the pool recycle water and the size of the pool relative to the capacity of the recycle system.

The present process requires a maximum of bromine liberation in the short period of time allowed for reaction and efficient bromine liberation is necessary in order to avoid build up of bromine residue in the pool. While many acidic substances are capable of liberating bromine from bromide, only a mineral acid gives the rapid and efficient results necessary for the practical operation of the process. For example, it has been found that essentially all of the bromine in a solution approximately 21 percent by weight in sodium bromide and 6.2 percent by weight in sodium bromate will be liberated by approximately 1.1 times the stoichiometric amount of hydrochloric acid. Further tests made by varying the normality of the hydrochloric acid employed with equal volumes of a solution 3.36 normal in 5:1 bromide-bromate and the contact time between the two solutions are summarized as follows:

| Normality of acid | Contact time in seconds | Mole percent excess acid | Percent bromine liberated |
|---|---|---|---|
| 6.0 | 20 | 79 | 100 |
| 6.0 | 60 | 79 | 100 |
| 3.40 | 20 | 1 | 93 |
| 3.59 | 20 | 7 | 97 |
| 3.70 | 20 | 10 | 97 |
| 3.70 | 60 | 10 | 99 |
| 3.94 | 20 | 17 | 99 |

The contact time referred to is the time the bromide-bromate soution and acid solution spend in the mixing chamber. The total time from initial contact until the introduction of the liberated bromine into the pool water recycle stream should be preferably between about 20 to 60 seconds. Such a period gives maximum liberation of elemental bromine yet avoids breakdown of the finely-dispersed emulsion of bromine in water prior to its mixing with the recycle stream.

A preferred aparatus for practicing the process of the invention is illustrated in the drawing. Hold tanks 11 and 12, formed of a suitable material such as polyethylene, are provided for separately storing the bromide-bromate and mineral acid solutions. The hold tanks 11 and 12 are connected by way of suitable conduits or tubing 13 and 14 to their respective, motor-driven, metering pumps 15 and 16. Discharge lines 17 and 18 connect pumps 15 and 16, respectively to the mixing chamber 19. Discharge line 20 connects the mixing chamber 19 with the pool water recirculating line (not shown). The motor-driven pumps 15 and 16 are connected to their power source via timer 21.

In the operation of the system, the bromide-bromate solution of tank 11 is passed by pump 15 and via lines 13 and 17 to the mixing chamber 19. In a similar fashion, the mineral acid solution of tank 12 is passed by pump 16 and via lines 14 and 18 to the same mixing chamber 19. The ratio of acid solution to bromide-bromate solution passed to the mixing chamber 19 is pre-set, by adjustment of metering pumps 16 and 15, to that which gives the maximum liberation of elemental bromine. The total amount of bromine liberated in mixing chamber 19 and passed to the pool recycle system via discharge line 20 is controlled by the timer 21. The timer 21 is set to achieve the desired bromine level in the water being brominated. If the bromine level in the pool water is found to be above or below a preselected value, the timing cycle is adjusted so as to bring the actual bromine level to its pre-selected value. Increasing the time cycle increases the amount of bromine supplied to the pool via its recycle system; conversely, decreasing the time cycle decreases the amount of bromine supplied to the pool. Simple adjustment of timer 21 is the only adjustment necessary for controlling the pool water bromine level.

Although we have illustrated and described our invention with reference to a swimming pool bromination process, it may be readily applied to a number of other purposes where the continuous formation of bromine water is required. Such uses include hardening the surface of latex-coated fabrics and rubber materials, sanitation of industrial waters, and chemical processes involving aqueous bromination.

We claim:

1. In a process for producing an aqueous bromine solution from an aqueous solution of bromide-bromate salts and mineral acid, the improvement comprising the steps of
 (a) pumping a stream of a concentrated aqueous solution of a mixture of bromide and bromate salts of about a 5:1 molar ratio, from a source thereof by pumping means positioned in flow relationship to a mixing zone between said solution source and said mixing zone,
 (b) pumping a stream of aqueous mineral acid of a concentration sufficient to convert substantially all the bromide-bromate salts in said solution to elemental bromine in said mixing zone, from a source thereof to said mixing zone by pumping means positioned in flow relationship between said acid source and said mixing zone, in an amount sufficient to maintain excess acid in said mixing zone, thereby converting substantially all of the bromide-bromate solution into a concentrated aqueous bromine solution in said mixing zone,
 (c) pumping the thus-obtained concentrated aqueous bromine solution as it is formed from said mixing zone to a second mixing zone,
 (d) mixing the aqueous bromine solution in said second mixing zone with a stream of a larger volume of water, thereby producing a diluted stream of aqueous bromine, and
 (e) mixing the stream of diluted aqueous bromine with a large body of water, thereby producing a highly dilute aqueous bromine solution in substantially quantitative yield from said mineral acid and said bromide-bromate salt solution.

2. A process according to claim 1 wherein the acid is hydrochloric acid and the salt mixture is a mixture of sodium bromide and sodium bromate.

3. A process according to claim 1 wherein the contact time for the solution and acid in the mixing zone is between about 20 to 60 seconds.

4. In a process for sanitizing the water in a swimming pool, having a recycle water system, with elemental bromine produced from an aqueous solution of bromide-bromate salts and mineral acid, the improvement comprises the steps of
 (a) pumping a stream of a concentrated aqueous solution of about 5:1 molar ratio mixture of sodium bromide and sodium bromate from a source thereof to a mixing zone by pumping means positioned in flow relationship between said source of the aqueous solution and said mixing zone,
 (b) pumping a stream of hydrochloric acid of at least about three normality from a source thereof to said mixing zone by pumping means positioned in flow relationship between said source of acid and said mixing zone in a metered quantity sufficient to maintain excess hydrochloric acid in said mixing zone, thereby converting substantially all said aqueous solution into a concentrated aqueous elemental bromine solution in said mixing zone,
 (c) pumping the thus-obtained concentrated aqueous bromine solution as it is formed from said mixing zone to a second mixing zone,
 (d) mixing the aqueous bromine solution in said second mixing zone with a stream of a larger volume of recycle water from the recycle system of the pool, thereby producing in the recycle system a diluted stream of aqueous bromine, and
 (e) mixing the diluted stream of aqueous bromine in the recycle system with the water of the swimming pool, thereby producing a highly dilute aqueaus bromine solution in substantially quantitative yield from said mineral acid and said bromide-bromate salt solution.

5. A process according to claim 4 wherein the contact time for the solution and acid in the mixing zone is between about 20 to 60 seconds.

References Cited by the Examiner

UNITED STATES PATENTS

| | | | |
|---|---|---|---|
| 1,141,922 | 6/1915 | Barstow | 23—216 |
| 2,918,400 | 12/1959 | Loonan | 167—17 |
| 3,053,842 | 9/1962 | Meissner | 137—99 X |
| 3,058,875 | 10/1962 | Goodenough | 167—17 |

MORRIS O. WOLK, *Primary Examiner.*